United States Patent
Barbour

(10) Patent No.: US 8,293,005 B2
(45) Date of Patent: Oct. 23, 2012

(54) PRE-BLEND CEMENT COMPOSITIONS CONTAINING PULVERIZED FLY ASH OR BOTTOM ASH

(76) Inventor: Ronald L. Barbour, Myrtle Beach, SC (US)

(*) Notice: Subject to any disclaimer, the term of this patent is extended or adjusted under 35 U.S.C. 154(b) by 0 days.

(21) Appl. No.: 12/650,098

(22) Filed: Dec. 30, 2009

(65) Prior Publication Data

US 2011/0048285 A1    Mar. 3, 2011

Related U.S. Application Data

(60) Provisional application No. 61/238,826, filed on Sep. 1, 2009.

(51) Int. Cl.
*C04B 18/06* (2006.01)
(52) U.S. Cl. .................. 106/705; 106/DIG. 1
(58) Field of Classification Search .................. 106/705, 106/DIG. 1
See application file for complete search history.

(56) References Cited

U.S. PATENT DOCUMENTS

| | | | | |
|---|---|---|---|---|
| 3,832,196 | A * | 8/1974 | Broussard | 106/706 |
| 4,494,990 | A * | 1/1985 | Harris | 524/5 |
| 5,624,491 | A * | 4/1997 | Liskowitz et al. | 106/705 |
| 5,772,752 | A * | 6/1998 | Liskowitz et al. | 106/705 |
| 5,849,075 | A * | 12/1998 | Hopkins et al. | 106/705 |
| 5,853,475 | A * | 12/1998 | Liskowitz et al. | 106/705 |
| 6,656,264 | B2 * | 12/2003 | Barbour | 106/705 |
| 6,730,161 | B2 * | 5/2004 | Lakshmanan et al. | 106/705 |
| 6,746,531 | B1 * | 6/2004 | Barbour | 106/709 |
| 6,939,401 | B2 * | 9/2005 | Barbour | 106/705 |
| 2005/0172863 | A1 * | 8/2005 | Terzo | 106/724 |
| 2006/0075929 | A1 * | 4/2006 | Barbour | 106/627 |
| 2007/0266906 | A1 * | 11/2007 | Garcia | 106/817 |

* cited by examiner

*Primary Examiner* — Paul Marcantoni
(74) *Attorney, Agent, or Firm* — Blank Rome LLP

(57) ABSTRACT

The present invention relates to the field of settable compositions for general purpose concrete mixes, and more particularly to settable compositions containing pulverized fly ash and/or bottom ash for improved final and early strength. The fly ash and/or bottom ash is pulverized to a Blaine fineness of 4000 cm$^2$/g or more.

18 Claims, No Drawings

PRE-BLEND CEMENT COMPOSITIONS CONTAINING PULVERIZED FLY ASH OR BOTTOM ASH

This application claims the priority of U.S. Provisional Patent Application Ser. No. 61/238,826, filed Sep. 1, 2009, which is incorporated herein by reference.

FIELD OF THE INVENTION

The present invention relates to the field of settable compositions for general purpose concrete mixes, and more particularly to settable compositions containing pulverized fly ash and/or bottom ash for improved final and early strength.

BACKGROUND OF THE INVENTION

When finely divided or pulverized coal is combusted at high temperatures, for example, in boilers for the steam generation of electricity, the ash, consisting of the incombustible residue plus a small amount of residual combustible matter, is made up of two fractions, a bottom ash recovered from the furnace or boiler in the form of a slag-like material and a fly ash which remains suspended in the flue gases from the combustion until separated therefrom by known separation techniques, such as electrostatic precipitation. This fly ash is an extremely finely divided material generally in the form of spherical bead-like particles, with at least 70 percent by weight passing a 200 mesh sieve, and has a generally glassy state resulting from fusion or sintering during combustion. As recognized in the American Society of Testing Materials (ASTM) specification designations C618-00 entitled "Fly Ash and Raw or Calcined Natural Pozzolan for Use as a Mineral Admixture in Portland Cement Concrete" and D5370-96 entitled "Standard Specification for Pozzolanic Blended Materials in Construction Application," fly ash is subdivided into two distinct classifications; namely, Class-F and Class-C. The definitions of these two classes given in the aforementioned ASTM specifications are as follows:

"Class-F—Fly ash normally produced from burning anthracite or bituminous coal that meets the applicable requirements for this class as given herein. This class fly ash has pozzolanic properties.

Class-C—Fly ash normally produced from lignite or subbituminous coal that meets the applicable requirements for this class as given herein. This class of fly ash, in addition to having pozzolanic properties, also has some cementitious properties. Some Class-C fly ashes may contain lime contents higher than 10 percent."

The latter reference to "pozzolanic properties" refers to the capability of certain mixtures that are not in themselves cementitious, but are capable of undergoing a cementitious reaction when mixed with calcium hydroxide in the presence of water. Class-C fly ash possesses direct cementitious properties as well as pozzolanic properties. ASTM C618-00 is also applicable to natural pozzolanic materials that are separately classified as Class N.

As the above quotation from the ASTM specification indicates, the type of coal combusted generally determines which class fly ash results, and the type of coal in turn is often dependent upon its geographic origin. Thus, Class-C fly ash frequently results from the combustion of coals mined in the Midwest United States; whereas Class-F fly ash often comes from combustion of coals mined in the Appalachian region of the United States. The ASTM specification imposes certain chemical and physical requirements upon the respective fly ash classifications which are set forth in U.S. Pat. No. 5,520,730, the disclosure of which is incorporated herein by reference.

Blast furnace slag is a by-product of the production of iron in a blast furnace; silicon, calcium, aluminum, magnesium and oxygen are the major elemental components of slag. Blast furnace slags include air-cooled slag resulting from solidification of molten blast furnace slag under atmospheric conditions; granulated blast furnace slag, a glassy granular material formed when molten blast furnace slag is rapidly chilled as by immersion in water; and pelletized blast furnace slag produced by passing molten slag over a vibrating feed plate where it is expanded and cooled by water sprays, whence it passes onto a rotating drum from which it is dispatched into the air where it rapidly solidifies to spherical pellets. In general, the glass content of the slag determines the cementitious character. Rapidly cooled slags have a higher glass content and are cementitious; slowly cooled slags are non-glassy and crystalline and, thus do not have significant cementitious properties.

The quantities of these by-product materials that are produced annually are enormous and are likely only to increase in the future. As petroleum oil as the fuel for the generation of electricity is reduced because of conservation efforts and unfavorable economics, and as political considerations increasingly preclude the construction of new nuclear power electrical generating facilities, or even the operation or continued operation of already completed units of this type, greater reliance will necessarily fall on coal as the fuel for generating electricity. As of 1979, the volume of Class-F fly ash that was available then was estimated to be about five times what could be readily utilized. The estimated annual total production of coal ash in the U.S. is about 66.8 million tons, while the annual total coal ash sales in the U.S. is only about 14.5 million tons. Further, in Canada, the recovery of copper, nickel, lead and zinc from their ores produces over twelve million tons of slag per year, which is usually accumulated near the smelters with no significant use. Obviously, there is an urgent and growing need to find effective ways of employing these unavoidable industrial by-products since they will otherwise collect at a staggering rate and create crucial concerns regarding their adverse environmental effects.

Various proposals have already been made for utilizing both types of fly ash. According to Lea (1971), *The Chemistry of Cement and Concrete*, Chemical Publishing Company, Inc., page 421 et seq., fly ash, i.e., Class-F type, from boilers was first reported to be potentially useful as a partial replacement for Portland cement in concrete construction about 50 years ago, and its utilization for that purpose has since become increasingly widespread. It is generally accepted that the proportion of Portland cement replaced by the usual fly ash should not exceed about 20 percent to avoid significant reduction in the compressive strength of the resultant concrete, although some more cautious jurisdictions may impose lower limits, e.g., the 15 percent maximum authorized by the Virginia Department of Highways and Transportation (VDHT). As described in Lea on page 437, the substitution of fly ash tends to retard the early rate of hardening of the concrete so that the concrete exhibits up to a 30 percent lower strength after seven days testing and up to a 25 percent lower strength after 28 days of testing, but in time the strength levels normalize at replacement levels up to 20 percent. Increasing the substitution quantity up to 30 percent gives more drastic reduction in the early compression values as well as an ultimate strength reduction of at least about 15 percent after one year.

The limited substitution of fly ash for Portland cement in concrete formulations has other effects beyond compressive strength changes, both positive and negative. The fly ash tends to increase the workability of the cement mix and is recognized as desirably reducing the reactivity of the Portland cement with so-called reactive aggregates. On the other hand, fly ash contains a minor content of uncombusted carbon that acts to absorb air entrained in the concrete. Because entrained air desirably increases the resistance of the hardened concrete to freezing, such reduction in entrained air is undesirable, but can be compensated for by the inclusion as an additive of so-called air-entraining agents.

Therefore, there remains a need for compositions containing cement and fly and/or bottom ash, which can achieve superior strength when compared to cement alone.

SUMMARY OF THE INVENTION

An advantage of the present invention is to provide a settable composition for improved strength comprising cement and pulverized fly ash and/or pulverized bottom ash. In an embodiment, cement is present in an amount greater than about 50% (by weight of the total cement mixture) and the pulverized fly ash and/or bottom ash is present in an amount of about 20 to 70% by weight, preferably 20-50%, more preferably 20-40%. The fly ash can be Class-F or Class-C fly ash or a combination thereof. The advantage of the invention is also realized when other components, such as slag (quenched or unquenched), silica fume, retarder, and accelerator are added to the composition. The compositions of the present invention offer high final strength (28 day), preferably about 2000 to 3000 PSI or more than cement alone. In combination with accelerators, high early strength (1 or 3 day) can also be achieved. Additionally, compositions using pulverized bottom ash are superior to compositions using pulverized fly ash when low expansion is desired in concrete.

Methods of making concrete and cement blends from the above compositions are also disclosed.

DETAILED DESCRIPTION OF THE PREFERRED EMBODIMENTS

Several different types of Portland cement are available and all are useful with the present invention. Type I and type II Portland cement are the general purpose variety and are most commonly employed, but Type III is preferable for the early strength application of the present invention. Commercial blended cements, such as Type I-P, wherein 20% by weight Class-F fly ash is blended with 80% by weight Portland cement clinker during pulverization are less favored.

Any standard or common Class-F fly ash obtained from boilers and like furnaces used for the combustion of pulverized coal, particularly of a bituminous or anthracite type, and especially from coal-fired, steam-generating plants of electrical utilities, is suitable for use as the Class-F fly ash component of this invention. Such fly ash should have a combined silica, alumina and ferric oxide content of at least about 70%, and preferably 80% by weight or higher and a lime (CaO) content below about 10%, usually about 6% by weight or less.

Any standard or common Class-C fly ash obtained from the burning of lignite or subbituminous coal is suitable for use as the Class-C fly ash component of this invention. Such Class-C fly ash generally contains more calcium and less iron than Class-F fly ash and has a lime content in the range of 15% to 30% by weight.

Bottom ash obtained from coal furnaces is appropriate for the present invention. Bottom ash is agglomerated ash particles, formed in pulverized coal furnaces, that are too large to be carried in the flue gases (ash carried in the flue gases is fly ash) and accumulates on the furnace walls and against steam tubes in the boiler. This build up can be blown off or simply falls off through open grates to an ash hopper at the bottom of the furnace, hence the name "bottom ash." Physically, bottom ash is typically grey to black in color, is quite angular, and has a porous surface structure. The present inventor has also discovered that bottom ash can also be classified as class C or class F depending on its chemistry. Class C and class F bottom ash have similar chemical composition when compared to class C and class F fly ash, respectively, except that the bottom ash contains no or very little carbon.

The fly ash and/or bottom ash can be pulverized using any method known in the art. In an embodiment, the fly ash is pulverized to a Blaine fineness of about 4000 $cm^2/g$ or greater, preferably 9000 $cm^2/g$ or greater, most preferably between about 4000 and 11000 $cm^2/g$. The pulverization can be accomplished by ball milling. Generally, ball milling occurs in a cylinder partly filled with steel balls (or other objects to pulverize the fly ash). The fly ash and/or bottom ash is fed into the cylinder as it rotates on its axis to impart a tumbling and cascading action to the balls and the fly ash. The fly ash and/or bottom ash is thus crushed by impact and ground by attrition between the balls. Although ball milling is disclosed herein, other processes, such as roller mills, roller presses, etc., can also be used to pulverize the fly ash and/or bottom ash. The final strength of the cement mixture is generally proportional to the fineness of the fly ash and/or bottom ash (the finer the ash, the higher the compressive strength of the cement). However, fine ash may cause the cement to set too early, and thus, retarders may be required in certain applications to slow the set time.

As will be established hereinafter, within the above limits for the compositions of the invention, the concretes produced therefrom exhibit substantially comparable or superior properties for use in general purpose cement construction, especially final strength and early setting time, as compared to mixes of cement only.

Concrete mixes using the present invention may also contain aggregate materials. The choice of aggregate material for concrete mixes using the present blends will pose no problem to the person skilled in the design of such mixes. The coarse aggregate should have a minimum size of about ⅜ inch and can vary in size from that minimum up to one inch or larger, preferably in gradations between these limits. Crushed limestone, gravel and the like are desirable coarse aggregates, and the material selected in any case should exhibit a considerable hardness and durability inasmuch as crumbly, friable aggregates tend to reduce significantly the strength of the ultimate concrete. The finely divided aggregate is smaller than ⅜ inch in size and again is preferably graduated in much finer sizes down to 200-sieve size or so. Ground limestone, sand and the like are common useful fine aggregates.

In accordance with the present invention, silica fume can also be added to the cement mixture to achieve high strength and chloride protection for the concrete. Silica fume is preferably used from 3-12 percent of the amount of cement mixture that is being used in the composition.

Other additives can also be used in accordance with the present invention, including, but is not limited to, water reducers, accelerators, retarders, air entrainment agents, corrosion inhibitors, shrinkage reducers, water reducers, superplasticizers, as well as other additives that are commonly used in the concrete industry. The additives can include, but are not limited to, calcium chloride, sodium chloride, cement kiln dust, potassium sulfate, potassium chloride, etc. The additive should be used at about 5% by weight or less, preferably about 3% by weight or less of the cement mixture. Preferably, the accelerator is selected from the group consisting of alkali metal halides (calcium chloride, potassium chloride and the like), alkali metal nitrites (calcium nitrite and the like), alkali metal nitrates (calcium nitrate and the like), alkali metal formates (calcium formate and the like), alkali metal thiocyanates (sodium thiocyanate and the like), triethanolamine and the like. The particular set accelerator to be used will depend on the known nature of the accelerators and side effects of the agent. For example, where metal corrosion is not a problem, calcium chloride might be chosen, while if corrosion is a problem, the nitrite or nitrate salts might be better used. The preferred accelerators are nitrates, such as calcium nitrate.

Thus, the weight percentages of cement, fly ash and/or bottom ash, slag, etc. (cement mixture) add up to 100% by weight. Additives are measured in weight percentage to the total cement mixture weight percentage of 100%. Hence, when the additives are combined with the mixture, the total weight percentage exceeds 100%.

The mixes of the invention are prepared by homogeneously and uniformly mixing all of the mix ingredients including cement and pulverized fly ash and/or bottom ash and/or other components including additives. Mixing can be accomplished with mixing techniques commonly employed in the concrete mix industry. The mixing can be performed at the blending plant or the cement mill to make blended cement, or anywhere in between. The ultimate compositions are no more susceptible to undergoing separation during handling and storage than are ordinary concrete mixes. They can be transported and stored in the same manner as the ordinary mixes, as can the individual ingredients. The storage containers should, of course, be closed to protect the contents thereof from weather.

The fly ash and/or bottom ash may be pulverized alone, and then be mixed with the other components of the mixture. Alternatively, pulverization can take place after all or some of the components are mixed. For example, the fly ash and/or bottom ash may be mixed with slag and/or cement and/or accelerator prior to being subjected to the pulverization process. Either way, it is important that the fly ash and/or bottom ash are pulverized to a condition that readily allows mixing with cement and an accelerator. Other components can also be pulverized, but that is not necessary for the present invention.

The following examples are given to illustrate the present invention. It should be understood that the invention is not limited to the specific conditions or details described in the examples.

EXAMPLES

The results in the following compositions were actually obtained by preliminarily blending, in each case, cement, Class-F fly ash, Class-C fly ash, bottom ash, and/or slag, together and combining the blend with the other mix ingredients. However, the results would be expected to be identical if the same proportionate amount for each of the components was added separately to the remaining mix ingredients. The proportionate amounts of the Class-F fly ash, Class-C fly ash, bottom ash, slag, potassium chloride, and calcium nitrate have been expressed in each case in terms of their relative weight percentages of the particular mix.

TABLE 1

| Cementitious Composition in weight percent: | | | | | Set time, minutes | | Cube Comp Str., psi | | | |
|---|---|---|---|---|---|---|---|---|---|---|
| Cement | Slag | FA | Ca(NO$_3$)$_2$ | KCl | Initial | Final | 1-d | 3-d | 7-d | 28-d |
| 100 | 0 | 0 | 0 | 0 | 160 | | | | | |
| 65 | 0 | 35* | 0 | 0 | 90 | | | | | |
| 65 | 0 | 35** | 0 | 0 | 190 | | | | | |
| 65 | 0 | 35* | 3 | 0 | 30 | | | | | |
| 65 | 0 | 35*** | 0 | 3 | 120 | | | | | |
| 65 | 0 | 35* | 0 | 3 | 50 | | | | | |
| ASTM C 595 Specifications | | | | | 45 min. | 420 max. | — | 1890 | 2900 | |

*Cement-fly ash blend ball-milled;
**not ball milled;
***fly ash (FA) only ball milled.
Note:
FA = fly ash

TABLE 2

| Cementitious Composition in weight % | | | | | Cube Comp Str., psi | | | | | |
|---|---|---|---|---|---|---|---|---|---|---|
| Cem | Slag | FA | Ca(NO$_3$)$_2$ | KCl | 1-d | 3-d | 7-d | 14-d | 21-d | 28-d |
| 100 | 0 | 0 | 0 | 0 | 2460 | 4500 | 5140 | 5910 | 6310 | 6560 |
| 70 | 0 | 30** | 3 | 0 | 1200 | 3140 | 3925 | 4450 | 5010 | 5350 |
| 70 | 0 | 30** | 0 | 3 | 2350 | 3975 | 4400 | 4975 | 5625 | 6100 |
| 65 | 0 | 35** | 3.5 | 0 | 1375 | 3090 | 3740 | 4240 | 4960 | 5200 |
| 80 | 10 | 10** | 0 | 3 | 3050 | 5300 | 6000 | 6410 | 6800 | 7050 |
| 50 | 20 | 30** | 3 | 0 | 950 | 2775 | 3650 | 4750 | 5575 | 6160 |
| 60 | 20 | 20** | 3 | 0 | 1010 | 2975 | 4050 | 5225 | 5890 | 6390 |
| 70 | 15 | 15** | 3 | 0 | 1410 | 3440 | 4750 | 5590 | 6450 | 6850 |
| 80 | 10 | 10** | 3 | 0 | 1660 | 3875 | 5075 | 5860 | 6250 | 6850 |
| ASTM C 595 Specifications | | | | | — | 1890 | 2900 | — | — | — |

**Not ball-milled

TABLE 3

| Cementitious Composition in weight percent: | | | | | Cube Comp Str., psi | | | | | |
|---|---|---|---|---|---|---|---|---|---|---|
| Cem | Slag | FA | Ca(NO₃)₂ | KCl | 1-d | 3-d | 7-d | 14-d | 21-d | 28-d |
| 100 | 0 | 0 | 0 | 0 | 2700 | 4275 | 5050 | 5590 | 5825 | 6450 |
| 65 | 0 | 35* | 0 | 3 | 3110 | 4640 | 5760 | 6800 | 7300 | 8375 |
| 65 | 0 | 35** | 0 | 3 | 2140 | 3150 | 3510 | 4540 | 4840 | 5750 |
| 65 | 0 | 35* | 3 | 0 | 2525 | 4300 | 5425 | 6550 | 7450 | 8375 |
| 100 | 0 | 0 | 0 | 0 | 2350 | 4175 | 5175 | | | |
| 65 | 0 | 35* | 0 | 0 | 1860 | 3390 | 4375 | | | |
| 100 | 0 | 0 | 0 | 0 | 2460 | 4500 | 5140 | 5910 | 6310 | 6560 |
| 70 | 0 | 30** | 0 | 3 | 2350 | 3975 | 4400 | 4975 | 5625 | 6100 |
| 80 | 10 | 10 | 0 | 3 | 3050 | 5300 | 6000 | 6410 | 6800 | 7050 |
| 50 | 20 | 30 | 3 | 0 | 950 | 2775 | 3650 | 4750 | 5575 | 6160 |
| 60 | 20 | 20** | 3 | 0 | 1010 | 2975 | 4050 | 5225 | 5890 | 6390 |
| 70 | 15 | 15** | 3 | 0 | 1410 | 3440 | 4750 | 5590 | 6450 | 6850 |
| 100 | 0 | 0 | 0 | 0 | 2660 | 4175 | 5140 | 5660 | 6040 | 5960 |
| 75 | 0 | 25** | 0 | 3 | 2660 | 3975 | 4910 | 5200 | 5840 | 6140 |
| 75 | 0 | 25** | 3 | 0 | 1750 | 3410 | 4440 | 5160 | 5710 | 5910 |
| 75 | 0 | 25** | 1.5 | 1.5 | 2450 | 4060 | 4760 | 5725 | 5910 | 6210 |
| 80 | 0 | 20** | 0 | 0 | 1975 | 3240 | 4075 | 4710 | 5225 | 5550 |
| 80 | 0 | 20** | 1 | 2 | 2775 | 4625 | 5350 | 6040 | 6410 | 6450 |
| 100 | 0 | 0 | 0 | 0 | 2700 | 4275 | 5050 | 5590 | 5825 | 6450 |
| 75 | 0 | 25* | 0 | 1.5 | 3800 | 5000 | 5910 | 6950 | 7440 | 8250 |
| 75 | 0 | 25** | 0 | 1.5 | 2710 | 4000 | 4800 | 5210 | 5625 | 6250 |
| 75 | 0 | 25* | 1.5 | 0 | 2725 | 4650 | 5790 | 6640 | 6975 | 8000 |
| 50 | 25 | 25** | 2 | 0 | 900 | 2050 | 2840 | 4425 | 4290 | 6125 |
| 50 | 30 | 20** | 2 | 0 | 850 | 2050 | 3290 | 4340 | 4600 | 6000 |

*Cement-fly ash blend ball-milled;
**Not ball-milled

TABLE 4

| Cementitious Composition in weight percent: | | | | Cube Comp Str., psi | | | | | |
|---|---|---|---|---|---|---|---|---|---|
| Cem | FA | Ca(NO₃)₂ | KCl | 1-d | 3-d | 7-d | 14-d | 21-d | 28-d |
| 100 | 0 | 0 | 0 | 2350 | 4275 | 5175 | 5725 | 6150 | 6490 |
| 65 | 35* | 0 | 0 | 1860 | 3390 | 4375 | 5325 | 6290 | 6490 |
| 65 | 35*** | 0 | 0 | 1900 | 3590 | 4600 | 6150 | 6875 | 7175 |
| ASTM C 595 Specifications | | | | — | 1890 | 2900 | — | — | 3620 |

*Cement-fly ash blend ball-milled;
**Not ball-milled;
***Fly ash only ball-milled

TABLE 5

| Cementitious Composition in weight percent: | | | | Cube Comp Str., psi | | | | | |
|---|---|---|---|---|---|---|---|---|---|
| Cem | FA | Ca(NO₃)₂ | KCl | 1-d | 3-d | 7-d | 14-d | 21-d | 28-d |
| 100 | 0 | 0 | 0 | 2660 | 4175 | 5140 | 5660 | 6040 | 5960 |
| 90 | 10** | 0 | 0 | 2210 | 3790 | 4700 | 5340 | 6000 | 5875 |
| 85 | 15** | 0 | 0 | 2210 | 3610 | 4550 | 5340 | 5650 | 5840 |
| 80 | 20** | 0 | 0 | 1975 | 3240 | 4075 | 4710 | 5225 | 5550 |
| 75 | 25** | 0 | 3 | 2660 | 3975 | 4910 | 5200 | 5840 | 6140 |
| 75 | 25** | 3 | 0 | 1750 | 3410 | 4440 | 5160 | 5710 | 5910 |
| 75 | 25** | 2 | 0 | 1560 | 3090 | 4175 | 5010 | 5600 | 5610 |
| 75 | 25** | 0 | 2 | 2410 | 3710 | 4760 | 5160 | 5525 | 5800 |
| 75 | 25** | 1.5 | 1.5 | 2450 | 4060 | 4760 | 5725 | 5910 | 6210 |
| 80 | 20** | 1 | 2 | 2775 | 4625 | 5350 | 6040 | 6410 | 6450 |
| ASTM C 595 Specifications | | | | — | 1890 | 2900 | — | — | 3620 |

*Cement-fly ash blend ball-milled;
**Not ball-milled

TABLE 6

| Cementitious Composition in weight percent: | | | | | | Cube Comp Str., psi | | | | | |
|---|---|---|---|---|---|---|---|---|---|---|---|
| Cem | Slag | FA | CaN | KCl | Retarder | 1-d | 3-d | 7-d | 14-d | 21-d | 28-d |
| 100 | 0 | 0 | 0 | 0 | 0 | 2275 | 3390 | 4410 | 4625 | 5040 | 4990 |
| 80 | 0 | 20F* | 1 | 2 | 0.06 | 3390 | 5210 | 6200 | 7210 | 7660 | 7550 |

TABLE 6-continued

| Cementitious Composition in weight percent: | | | | | | Cube Comp Str., psi | | | | | |
|---|---|---|---|---|---|---|---|---|---|---|---|
| Cem | Slag | FA | CaN | KCl | Retarder | 1-d | 3-d | 7-d | 14-d | 21-d | 28-d |
| 60 | 0 | 40C | 2 | 1 | 0 | 2040 | 4060 | 5090 | 5600 | 5890 | 6190 |
| 60 | 0 | 40F* | 1 | 2 | 0 | 2900 | 4525 | 5675 | 7260 | 7940 | 8125 |
| 50 | 20 | 30F* | 0 | 3 | 0.06 | 2290 | 4525 | 6525 | 7440 | 8125 | 8575 |
| 60 | 0 | 40C* | 2 | 1 | 0 | 2310 | 4200 | 5200 | 6240 | 6450 | 6825 |
| 50 | 25 | 25F* | 3 | 0 | 0.06 | 1375 | 3790 | 5525 | 6975 | 7500 | 8060 |
| 70 | 30 | 0 | 0 | 3 | 0 | 2625 | 4800 | 5640 | 6775 | 7040 | 7290 |
| 80 | 20 | 0 | 0 | 3 | 0 | 2750 | 5025 | 5840 | 6350 | 6460 | 6560 |
| 75 | 25 | 0 | 0 | 3 | 0 | 2925 | 4810 | 5900 | 6990 | 7040 | 6975 |
| ASTM C 595 Specifications | | | | | | — | 1890 | 2900 | — | — | 3620 |

*Fly ash ball-milled;
**Not ball-milled
CaN is calcium nitrate; Retarder is potassium sodium tartrate

TABLE 7

ASTM C 191 Vicat Set Times-RMTI Lab

| Cementitious Composition in weight percent:* | | | | | Set time, minutes | | Cube Comp Str., psi | | | |
|---|---|---|---|---|---|---|---|---|---|---|
| Cement | Class F | Slag | KCl | Ca(NO3)2 | Initial | Final | 1-d | 3-d | 7-d | 28-d |
| 100 | 0 | 0 | 0 | 0 | 90 | 220 | 2375 | — | 5550 | 7690 |
| 75 | 10 | 15 | 3 | 0 | 125 | 235 | 2600 | — | 6690 | 8000 |
| 50 | 20 | 30 | 1 | 1 | 85 | 200 | 1080 | 3120 | 4440 | 7410 |
| ASTM C 595 Specifications | | | | | 45 min. | 420 max. | — | 1890 | 2900 | 3620 |

*No ball milling for all compositions

TABLE 8

ASTM C 191 Vicat Set Times-RMTI Lab

| Cementitious Composition in weight percent*: | | | | | Set time, minutes | | Cube Comp Str., psi | | |
|---|---|---|---|---|---|---|---|---|---|
| Cement | Class F | Slag | Ca(NO$_3$)$_2$ | KCl | Initial | Final | 1-d | 7-d | 28-d |
| Titan Cement Mixes | | | | | | | | | |
| 100 | 0 | 0 | 0 | | 90 | 220 | 2375 | 5550 | 7690 |
| 70 | 0 | 30 | 0 | | 110 | 260 | 1460 | 4210 | 7625 |
| 50 | 0 | 50 | 0 | | 140 | 290 | 890 | 3760 | 7750 |
| 85 | 15 | 0 | 0 | | 80 | 240 | 1840 | 4425 | 6700 |
| 70 | 30 | 0 | 0 | | 110 | 240 | 1560 | 3590 | 5750 |
| 50 | 15 | 35 | 0 | | 140 | 290 | 890 | 3390 | 7250 |
| 70 | 0 | 30 | | | 80 | 180 | 900 | 4300 | 7875 |
| 50 | 0 | 50 | 1 | | 100 | 240 | 600 | 3925 | 7690 |
| 85 | 15 | 0 | 1 | | 60 | 210 | 1190 | 4790 | 7125 |
| 70 | 30 | 0 | 1 | | 60 | 200 | 875 | 3460 | 5750 |
| 50 | 15 | 35 | 1 | | 90 | 195 | 625 | 3410 | 7325 |
| Speed Cement | | | | | | | | | |
| 100 | 0 | 0 | 0 | 0 | — | — | 2025 | 4740 | 6675 |
| 85 | 15 | 0 | 0 | 0 | — | — | 1690 | 4060 | 6140 |
| 85 | 15 | 0 | 1 | 0 | — | — | 1440 | 4410 | 6525 |
| Titan Cement | | | | | | | | | |
| 85 | 15 | 0 | 0 | 2 | — | — | 2740 | 5900 | 7360 |
| 85 | 15 | 0 | 1 | 1 | — | — | 2290 | 5675 | 7175 |
| ASTM C 595 Specifications | | | | | 45 min. | 420 max | — | 2900 | 3620 |

*No ball milling for all compositions

TABLE 9

ASTM C 191 Vicat Set Times-RMTI Lab

Titan Cement Mixes

| Cementitious Composition in weight percent*: | | | | | Set time, minutes | | Cube Comp Str., psi | | | |
|---|---|---|---|---|---|---|---|---|---|---|
| Cement | Class F | Slag | Ca(NO$_3$)$_2$ | KCl | Initial | Final | 1-d | 3-d | 7-d | 28-d |
| 70 | 0 | 30 | 2 | 0 | 55 | 160 | 1240 | 3125 | 4360 | 7940 |
| 50 | 0 | 50 | 2 | 0 | 55 | 190 | 825 | 2700 | 4360 | 7560 |
| 85 | 15 | 0 | 2 | 0 | 40 | 100 | 1440 | 3500 | 4610 | 6725 |
| 70 | 30 | 0 | 2 | 0 | 45 | 95 | 1090 | 2940 | 3750 | 5800 |
| 50 | 15 | 35 | 2 | 0 | 55 | 160 | 710 | 2330 | 3550 | 7000 |
| 50 | 15 | 35 | 3 | 0 | 40 | 100 | 725 | 2725 | 4130 | 7400 |
| 50 | 15 | 35 | 1 | 1 | 75 | 175 | 1140 | 3105 | 4480 | 7150 |
| 50 | 20 | 30 | 2 | 2 | 70 | 175 | 1125 | 3390 | 5180 | 7450 |
| 50 | 20 | 30 | 1 | 1 | 85 | 200 | 1080 | 3120 | 4440 | 7410 |
| 60 | 15 | 25 | 1.5 | 1.5 | 70 | 180 | 1360 | 3505 | 4960 | 7425 |
| AASHTO M240 Specifications | | | | | 45 min. | 420 max | | 1890 | 2900 | 3620 |

*No ball milling for all compositions

TABLE 10

ASTM C 191 Vicat Set Times-RMTI Lab

| Cementitious Composition in weight percent*: | | | | | Set time, minutes | | Cube Comp Str., psi | | | |
|---|---|---|---|---|---|---|---|---|---|---|
| Cement | Class F | Slag | Ca(NO$_3$)$_2$ | KCl | Initial | Final | 1-d | 3-d | 7-d | 28-d |
| Titan Cement Mixes | | | | | | | | | | |
| 85 | 15 | 0 | 0.5 | 0 | 60 | 165 | 1950 | 3075 | 4375 | 6840 |
| 70 | 30 | 0 | 0.5 | 0 | 70 | 170 | 1475 | 2520 | 3455 | 5600 |
| 50 | 15 | 35 | 0 | 3 | 105 | 190 | 1525 | 4025 | 5810 | 7325 |
| 50 | 15 | 35 | 0 | 4 | 105 | 190 | 1625 | 4190 | 5720 | 7490 |
| Jan. 31, 2009 Mixes | | | | | | | | | | |
| 70 | 15 | 15 | 0 | 3 | 120 | 210 | 2140 | ND | 6225 | 7500 |
| 70 | 15 | 15 | 0 | 4 | 110 | 200 | 2290 | ND | 6250 | 7340 |
| AASHTO M240 Specifications | | | | | 45 min. | 420 max | | 1890 | 2900 | 3620 |

*No ball milling for all compositions

TABLE 11

ASTM C 191 Vicat Set Times-RMTI Lab

Titan Cement Mixes

| Cementitious Composition in weight percent***: | | | | Set time, minutes | | Cube Comp Str., psi | | |
|---|---|---|---|---|---|---|---|---|
| Cement | Class F | Slag | KCl | Initial | Final | 1-d | 7-d | 28-d |
| 75 | 10 | 15 | 3 | * | * | 2600 | 6690 | 8000- |
| 75 | 10 | 15 | 4 | 100 | 185 | 2680 | 6450 | 7250 |
| 75 | 10 | 15 | 5 | 105 | 190 | ** | ** | ** |
| 80 | 10 | 10 | 3 | * | * | 2945 | 6510 | 7500 |
| 80 | 10 | 10 | 4 | 85 | 170 | 2925 | 6440 | 7750 |
| 80 | 10 | 10 | 5 | 95 | 175 | ** | ** | ** |
| 85 | 15 | 0 | 3 | * | * | 2945 | 6090 | 7125 |
| 85 | 15 | 0 | 4 | 100 | 180 | 3040 | 6090 | 6875 |
| 85 | 15 | 0 | 5 | 110 | 185 | ** | ** | ** |
| 85 | 0 | 15 | 3 | * | * | 3025 | 7340 | 8000 |
| 85 | 0 | 15 | 4 | 90 | 170 | 3150 | 7260 | 7750 |
| 85 | 0 | 15 | 5 | 90 | 165 | ** | ** | ** |
| AASHTO M 240 Specifications | | | | 45 min. | 420 max | | 2900 | 3620 |

* Set Times not determined;
** compression strength not determined
*** No ball milling for all compositions

TABLE 12

ASTM C 191 Vicat Set Times-RMTI Lab

| Titan Cement Mixes Cementitious Composition in weight percent*: | | | | Set time, minutes | | Cube Comp Str., psi | | |
|---|---|---|---|---|---|---|---|---|
| Cement | Class F | Slag*** | KCl | Initial | Final | 1-d | 7-d | 28-d |
| 75 | 10 | 15 | 3 | | | 2600 | 6690 | 8000- |
| 75 | 10 | 15 | 4 | 100 | 185 | 2680 | 6450 | 7250 |
| 75 | 10 | 15 | 5 | 105 | 190 | | | |
| 80 | 10 | 10 | 3 | | | 2945 | 6510 | 7500 |
| 80 | 10 | 10 | 4 | 85 | 170 | 2925 | 6440 | 7750 |
| 80 | 10 | 10 | 5 | 95 | 175 | | | |
| 85 | 15 | 0 | 3 | | | 2945 | 6090 | 7125 |
| 85 | 15 | 0 | 4 | 100 | 180 | 3040 | 6090 | 6875 |
| 85 | 15 | 0 | 5 | 110 | 185 | | | |
| 85 | 0 | 15 | 3 | | | 3025 | 7340 | 8000 |
| 85 | 0 | 15 | 4 | 90 | 170 | 3150 | 7260 | 7750 |
| 85 | 0 | 15 | 5 | 90 | 165 | | | |
| AASHTO M 240 Specifications | | | | 45 min. | 420 max | | 2900 | 3620 |

*No ball milling for all compositions

TABLE 13

| Cementitious Composition in weight percent: | | | | | | Cube Comp Str., psi | | | | | |
|---|---|---|---|---|---|---|---|---|---|---|---|
| Cem | Slag | FA | CaN | KCl | Retarder | 1-d | 3-d | 6-d | 14-d | 24-d | 28-d |
| 100 | 0 | 0 | 0 | 0 | 0 | 2725 | 4240 | 4940 | 5325 | 5900 | 5690 |
| 70 | 30* | 0 | 1 | 2 | 0.06 | 2610 | 4000 | 4460 | 5050 | 5250 | 5340 |
| 50 | 50* | 0 | 3 | 0 | 0.36 | 10 | 15 | 1050 | 2275 | 2850 | 2450 |
| 50 | 20* | 30F* | 0 | 3 | 0.18 | 1225 | 2810 | 3775 | 4960 | 6040 | 6075 |
| 50 | 0 | Mix* | 1.5 | 1.5 | 0 | 2240 | 4040 | 5075 | 6710 | 7475 | 7660 |
| ASTM C 595 Specifications | | | | | | — | 1890 | 2900 | — | — | 3620 |

*Ball-milled;
**Not ball-milled;
***The slag has not been quenched (elsewhere if not indicated as being unquenched, the slag is quenched)
CaN is calcium nitrate; Retarder is potassium sodium tartrate.
Mix is 20% F and 30% C fly ash
Note:
Normal dose rate for the retarder is 0.06% or less. The mixes with higher amounts are probably overly retarded.

TABLE 14

| Cementitious Composition in weight percent: | | | | | Cube Comp Str., psi | | | | | |
|---|---|---|---|---|---|---|---|---|---|---|
| Cem | Slag* | FA | KCl | Retarder | 1-d | 3-d | 7-d | 14-d | 21-d | 28-d |
| 100TI | 0 | 0 | 0 | 0 | 2025 | 3850 | 4975 | 5340 | | |
| 100TII | 0 | 0 | 0 | 0 | 2275 | 4060 | 5090 | 5650 | | |
| 80TI | 20 | 0 | 3 | 0.01 | 2960 | 4090 | 4460 | 4890 | | |
| 70TI | 30 | 0 | 3 | 0 | 2850 | 3890 | 4290 | 4960 | | |
| 50TI | 50 | 0 | 3 | 0 | 1525 | 2660 | 3375 | 3840 | | |
| 80TII | 20 | 0 | 3 | 0.01 | 3110 | 4850 | 5490 | 5900 | | |
| 70TII | 30 | 0 | 3 | 0 | 2675 | 4375 | 4925 | 5540 | | |
| 50TII | 50 | 0 | 3 | 0 | 1550 | 3075 | 3610 | 4040 | | |
| 50TI | 20 | 30 | 3 | 0 | 1750 | 3110 | 4550 | 5690 | | |
| 50TII | 20 | 30 | 3 | 0 | 1690 | 3210 | 4610 | 5810 | | |
| ASTM C 595 Specifications | | | | | — | 1890 | 2900 | — | — | 3620 |

CaN is calcium nitrate; Retarder is potassium sodium tartrate; slag and fly ash are ball milled to Blaine fineness of 9360 $cm^2/g$ for slag and 9480 $cm^2/g$ for fly ash.
*The slag has not been quenched (elsewhere if not indicated as being unquenched, the slag is quenched)

TABLE 15

| Cementitious Composition in weight percent: | | | | Cube Comp Str., psi | | | | | |
|---|---|---|---|---|---|---|---|---|---|
| Cem | FA | KCl | CaN | 1-d | 3-d | 7-d | 14-d | 21-d | 28-d |
| 100 | 0 | 0 | 0 | 2840 | 4660 | 5525 | 6525 | 6810 | 6690 |
| 80 | 20 | 3 | 0 | 3640 | 5660 | 6660 | 7340 | 8505 | 9095 |
| 70 | 30 | 3 | 0 | 3310 | 5225 | 6610 | 7875 | 9045 | 9230 |
| 50 | 50 | 3 | 0 | 2050 | 4075 | 5790 | 7250 | 8235 | 8290 |

TABLE 15-continued

| Cementitious Composition in weight percent: | | | | Cube Comp Str., psi | | | | | |
|---|---|---|---|---|---|---|---|---|---|
| Cem | FA | KCl | CaN | 1-d | 3-d | 7-d | 14-d | 21-d | 28-d |
| 50 | 50 | 0 | 3 | 1650 | 3140 | 4875 | 6500 | 7140 | 8025 |
| 50 | 50 | 1.5 | 1.5 | 1860 | 3340 | 5360 | 6775 | 7425 | 8290 |
| 50 | 50* | 3 | 0 | 1600 | 2610 | 3475 | 4310 | 4650 | 5300 |
| 50 | 50 | 0 | 0 | 1575 | 2900 | 4050 | 5775 | 6490 | 6810 |
| ASTM C 595 Specifications | | | | — | 1890 | 2900 | — | — | 3620 |

CaN is calcium nitrate; Retarder is potassium sodium tartrate; fly ash is ball milled (except as noted) to Blaine fineness of 9540 cm$^2$/g for slag and 9480 cm$^2$/g for fly ash.
*Not ball milled (Blaine fineness is 9540 cm$^2$/g)

TABLE 16

| Cementitious Composition in weight percent: | | | | Cube Comp Str., psi | | | | | |
|---|---|---|---|---|---|---|---|---|---|
| Cem | CBA | FBA | KCl | 1-d | 3-d | 7-d | 14-d | 21-d | 28-d |
| 100 | 0 | 0 | 0 | 2760 | 4625 | 5290 | 6450 | 6525 | 6990 |
| 70 | 30 | 0 | 0 | 2000 | 4060 | 4700 | 5475 | 6090 | 6675 |
| 70 | 30 | 0 | 3 | 2700 | 4590 | 5500 | 6510 | 6860 | 7075 |
| 50 | 50 | 0 | 0 | 1210 | 2760 | 3510 | 4375 | 5110 | 5550 |
| 50 | 50 | 0 | 3 | 1660 | 3150 | 4450 | 5540 | 6400 | 6360 |
| 70 | 0 | 30 | 0 | 2200 | 3975 | 4950 | 6250 | 7190 | 7625 |
| 70 | 0 | 30 | 3 | 2760 | 4925 | 6225 | 7410 | 8125 | 8490 |
| 50 | 0 | 50 | 0 | 1400 | 2850 | 4225 | 5450 | 6310 | 6450 |
| 50 | 0 | 50 | 3 | 1625 | 3590 | 5010 | 6125 | 7050 | 7460 |
| ASTM C 595 Specifications | | | | — | 1890 | 2900 | — | — | 3620 |

CBA is class B bottom ash (Blaine fineness 9,580 cm$^2$/g); FBA is class F bottom ash (Blaine fineness 11,920 cm$^2$/g)

TABLE 17

ASTM C 441 Alkali Reactivity Mortar Bar Expansion, %

| | 14 D | 28 D |
|---|---|---|
| Tijeras Cement Low Alkali 15702B | 0.133 | 0.294 |
| 20% Class C Bottom Ash* 16087 | 0.022 | 0.092 |
| 20% Class C Fly Ash* 16218 | 0.159 | 0.302 |
| 20% Class F fly Ash* 16215 | 0.007 | 0.010 |

Note:
This test is used to evaluate the effectiveness of a pozzolan in reducing the expansion of concrete containing reactive aggregate.
*ash is pulverized

TABLE 18

ASTM C 1012 Sulfate Resistance Mortar Bar Expansion, %

| | 6-mo | 1-yr | 2-yr |
|---|---|---|---|
| Tijeras Cement Low Alkali 15702A | 0.050 | 0.093 | 0.238 |
| 20% Class C Bottom Ash* 16087 | 0.042 | 0.051 | 0.091 |
| 20% Class C Fly Ash* 16119 | 0.071 | 0.147 | 0.756 |
| 20% Class F fly Ash* 16120 | 0.046 | 0.051 | 0.092 |
| 50% Slag 12718B | 0.022 | 0.024 | 0.029 |
| 50% Class C Bottom Ash* 16087 | 0.050 | 0.065 | 0.105 |

Note:
This test is used to evaluate the effectiveness of a pozzolan in reducing the expansion of concrete exposed to sulfate.
*ash is pulverized Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A composition comprising cement, pulverized fly ash and/or pulverized bottom ash, and an accelerator, wherein the pulverized fly ash and/or pulverized bottom ash has a Blaine fineness of between about 4000 cm$^2$/g and about 11,000 cm$^2$/g and meets ASTM C 595 requirements.

2. The composition of claim 1, wherein the cement is Portland cement.

3. The composition of claim 1, further comprising slag.

4. The composition of claim 1, further comprising an additive selected from the group consisting of water reducers, retarders, air entrainment agents, corrosion inhibitors, shrinkage reducers, water reducers, or superplasticizers.

5. The composition of claim 4, wherein the total amount of additive is about 5% or less by weight.

6. The composition of claim 1, wherein the fly ash and/or bottom ash is present at about 20 to 40% by weight.

7. The composition of claim 1, wherein the cement is present at greater than about 50% by weight.

8. A method for preparing a cement mixture component comprising the steps of:
   a. selecting one or more of the following components: fly ash or bottom ash; and
   b. pulverizing said one or more components into a condition that is readily mixed with cement and an accelerator to form the cement mixture, wherein the pulverized fly ash and/or pulverized bottom ash has a Blaine fineness of between about 4000 cm$^2$/g and about 11,0000 cm$^2$/g and the cement mixture meets ASTM C 595 requirements.

9. The method of claim 8, further comprising the step of mixing the one or more components with cement.

10. The method of claim 9, wherein the one or more components is pulverized to a Blaine fineness of 4000 cm$^2$/g or more.

11. The method of claim 9, wherein the one or more components is pulverized to a Blaine fineness of 9000 cm$^2$/g or more.

12. The method of claim 9, wherein step further comprising the step of adding slag.

13. The method of claim 9, wherein further comprising the step of adding an additive selected from the group consisting of water reducers, retarders, air entrainment agents, corrosion inhibitors, shrinkage reducers, water reducers, or superplasticizers.

14. The method of claim 13, wherein the total amount of additive is about 5% or less by weight.

15. An enhanced cement mixture component comprising a material selected from the group consisting of fly ash and bottom ash, wherein the material has been pulverized into a condition that is readily mixed with cement and an accelerator, and wherein the pulverized fly ash and/or pulverized bottom ash has a Blaine fineness of between about 4000 $cm^2/g$ and about 11,0000 $cm^2/g$ and the cement mixture meets ASTM C 595 requirements.

16. The mixture of claim 15, further comprising an accelerator.

17. The mixture of claim 15, further comprising slag.

18. The mixture of claim 15, further comprising an additive selected from the group consisting of water reducers, retarders, air entrainment agents, corrosion inhibitors, shrinkage reducers, water reducers, or superplasticizers.

* * * * *